June 27, 1961 C. E. WILSON 2,989,831
MOUNTING AND HYDRAULIC CONTROL MEANS FOR A RECIPROCATING MOWER
Filed April 12, 1957 2 Sheets-Sheet 1
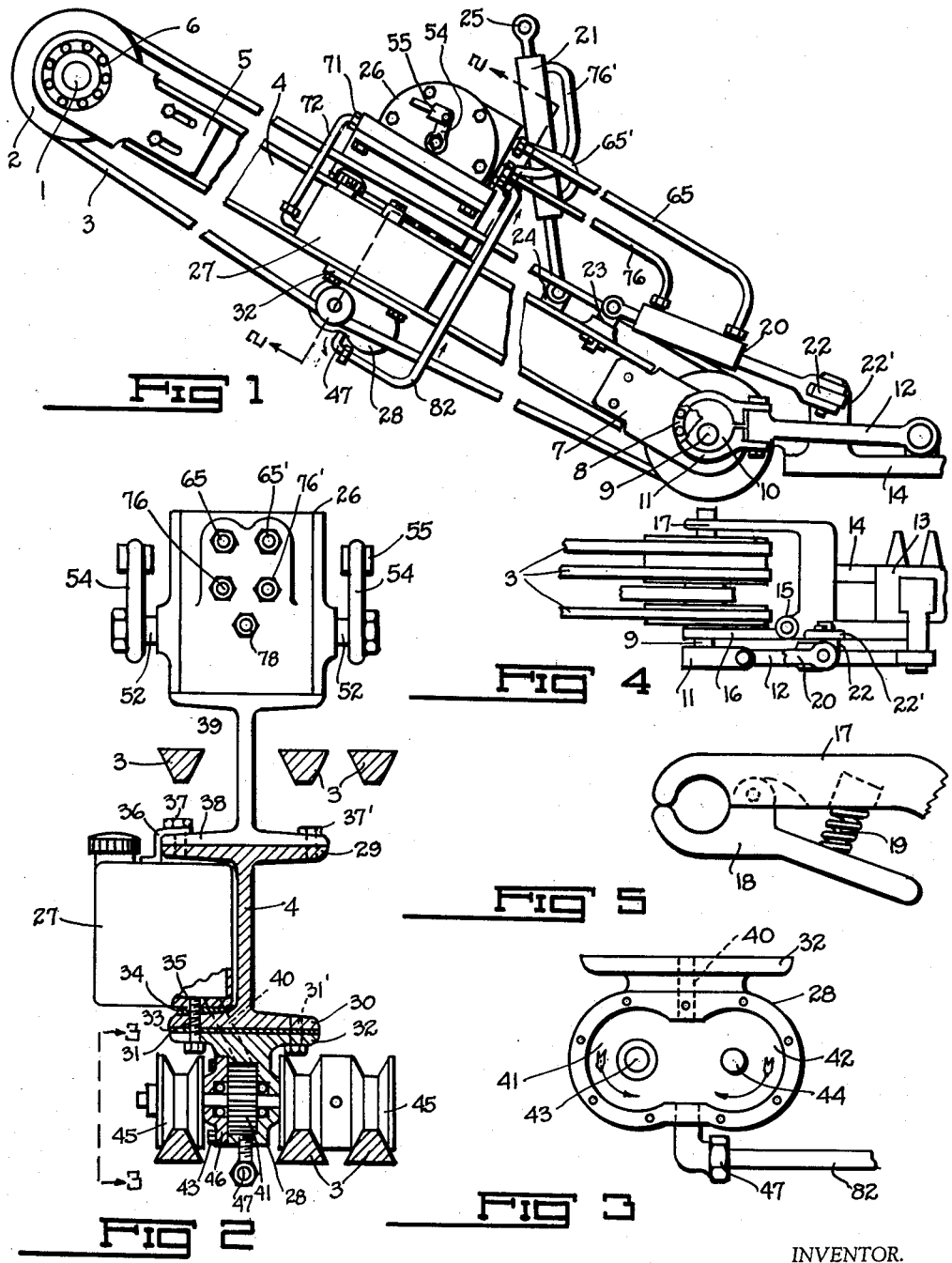
INVENTOR.
CHARLES E. WILSON
BY
Charles Richard Werner
ATTORNEY

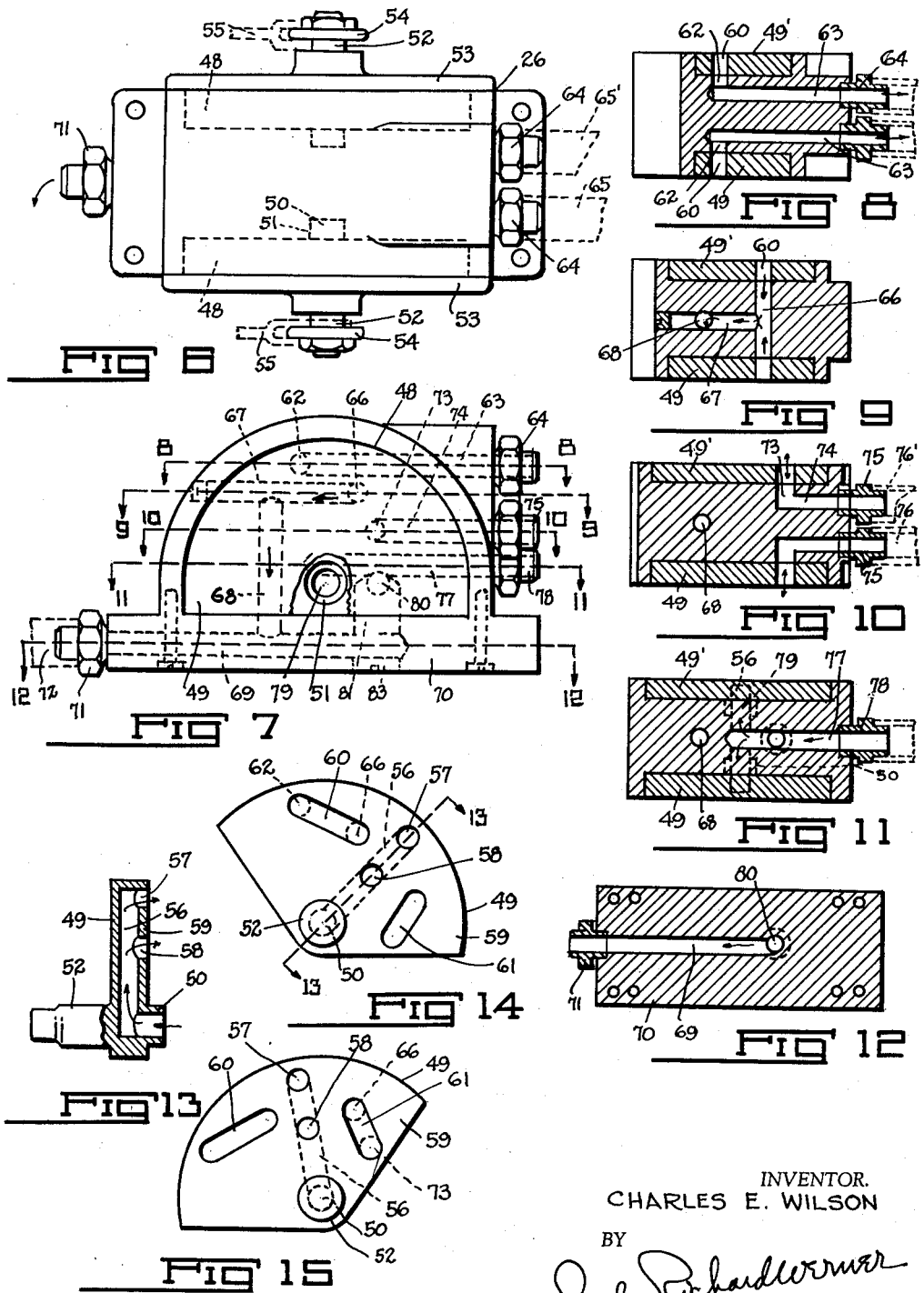

United States Patent Office 2,989,831
Patented June 27, 1961

2,989,831
MOUNTING AND HYDRAULIC CONTROL MEANS FOR A RECIPROCATING MOWER
Charles E. Wilson, Cicero, Ill.
(Rte. 3, Box 482, Bluefield, W. Va.)
Filed Apr. 12, 1957, Ser. No. 652,410
5 Claims. (Cl. 56—25)

This invention relates in general to a vehicle carried power control device for implements and in particular to such a device in combination with farm implements and the like in which simultaneous or individual multiple actuation of movable elements of mowers, earth working or other devices is desired.

This application covers an improvement over what I have disclosed in a pending application on "Mower Bar Attachment," Serial Number 455,254, now Patent No. 2,803,936, filed September 10, 1954. This application, hereinafter, speaks primarily of a mower bar attachment, but it is to be understood that the power control device can be used with equally effective results on numerous farm, earthworking, road, construction or other machinery.

The objects of the invention are:

First; to provide a vehicle carried power control device for a mower bar attachment including a hydraulic control means whereby the mower bar may be raised or lowered and the blade tilted or leveled in a simple and expeditious manner.

Second; to provide a compact hydraulic control head with a simple housing, ports and control valves whereby either or both valves can be quickly and easily moved to obtain any degree of adjustment desired with no interference between the valves.

Third; to provide a hydraulic control means in combination with a pivoted beam wherein all elements of the hydraulic control means are self-contained on the beam with only manually operated cables running to the control unit from the vicinity of the vehicle operator.

Fourth; to provide a hydraulic control means mounted on a rigid beam with the hydraulic pump, hydraulic fluid supply tank and hydraulic control valve unit so related as to provide a compact assembly with short supply lines, the hydraulic pump being driven by the mower blade drive, the entire assembly being adapted for easy mounting on a truck, tractor, jeep or other vehicle and driven by the power takeoff on the vehicle.

Other objects and advantages as well as the construction and operation of my invention will be better understood by reference to the following specifications in connection with the accompanying drawings in which:

FIG. 1 is a vertical elevational view of the mower bar control system with a fragmentary portion of the mower blade being shown.

FIG. 2 is an enlarged transverse section on the line 2—2 of FIG. 1, portions being shown in elevation.

FIG. 3 is a further enlarged elevational view of the pump unit with the cover plate removed as seen on the line 3—3 of FIG. 2, the pulleys and belts being omitted.

FIG. 4 is a fragmentary top plan view of a portion of the mower blade and its attachment to the mower bar.

FIG. 5 is an enlarged detail elevational view of an emergency release attaching means for the mower blade.

FIG. 6 is an enlarged top plan view of the hydraulic control valve unit.

FIG. 7 is a vertical elevational view of the same.

FIG. 8 is a horizontal cross sectional view on the line 8—8 of FIG. 7.

FIG. 9 is a horizontal cross sectional view on the line 9—9 of FIG. 7.

FIG. 10 is a horizontal cross sectional view on the line 10—10 of FIG. 7.

FIG. 11 is a horizontal cross sectional view on the line 11—11 of FIG. 7.

FIG. 12 is a horizontal cross sectional view on the line 12—12 of FIG. 7.

FIG. 13 is a cross sectional view on the line 13—13 of FIG. 14.

FIG. 14 is an elevational view of one side of a valve segment in blade raising position.

FIG. 15 is a similar view with the valve segment in blade lowering position.

Referring now to the drawings by numerals of reference, 1 designates a shaft suitably supported and driven in any well known manner from a power takeoff on a truck, tractor, jeep or other vehicle. A plurality of pulleys 2 are mounted on the shaft 1 and are adapted to drive belts 3 for the purpose hereinafter specified.

An elongated beam 4 carries adjustable end bracket 5 in which a suitable bearing 6 is positioned for pivotal movement about the shaft 1 with the shaft free to rotate. The lower end of beam 4 has a second end bracket 7 with bearing 8 in which shaft 9 is mounted, said shaft being fixed to eccentric 10 which rotates in collar 11 pivotally carrying arm 12 suitably connected to the mower blade 13 for cutting actuation thereof in relation to the cutter bar 14.

The cutter bar has fork 15 pinned to arm 16 which is pivotally mounted on shaft 9. A bent arm 17 and pivoted lug 18 urged by spring 19 form a releasable shock mounting to the other end of shaft 9 permitting mower bar and blade to swing back when an undue shock is encountered, the arm 17 and lug 18 being manually snapped back into position for continuing cutting operations.

The portion of my invention thus far described is substantially the same as disclosed in the pending application hereinbefore mentioned, except for the releasable shock mounting just described.

In the operation of the mower attachment two movements are necessary. One is to raise and lower the beam on which the mower bar and blade are attached and the other is to pivot the mower bar so that it can be kept parallel to the ground being mowed. Toward this end the hydraulic units 20 and 21 are provided, mower bar hydraulic unit 20 having one end pivotally carried on fitting 22 pinned to lug 22' extending from the mower bar, the other end of unit 20 being pinned to lug 23 on the beam 4, said lug being pivotally connected to the beam to permit swinging of unit 20 when the mower bar swings back due to encountering an obstruction.

The second hydraulic unit 21 has one end pivotally mounted to lug 24 on the beam 4, the other end 25 of unit 21 being suitably mounted to the truck, tractor, jeep or other vehicle on which the mower is attached.

Substantially midway between the ends of the beam 4 are located the hydraulic control housing 26, hydraulic fluid tank 27 and the hydraulic pump 28. The tank 27 is shown mounted between the flanges 29 and 30 of beam 4, suitable bolts 31 passing through flange 32 of the pump 28, through gasket 33, flange 30 of beam 4, gasket 34, and into threaded aperture 35 in the bottom of the tank 27. Other bolts 31' fasten flanges 30 and 32 together. Clamps 36 on top of tank 27 are held by fastening members 37 which pass through flanges 38 of H-section support 39 for the hydraulic control, other fastening members 37' holding flanges 29 and 38 together.

Aligning apertures in tank 27, gasket 33, flange 30, gasket 34 and pump 28 form a conduit 40 between the tank 27 and the pump 28, the latter being of conventional construction with opposing gears 41 and 42 on shafts 43 and 44, shaft 43 extending from the housing and carrying pulleys 45 engaged by belts 3. Removable cover 46 provides access to the interior of the pump. A discharge outlet 47 is provided for the pump.

The hydraulic control housing 26 is substantially semicircular with oppositely disposed valve chambers 48 in which segment valves 49 and 49' are located. The segment valves are identical in construction except that one is right and one is left.

For the purposes of this specification like numbers have been given the like portions of the right and left hand segment valves and control housing.

A hollow stub shaft 50 extends from one side of the valve and is positioned in a suitable recess 51 in the control housing 26, and a shaft 52 oppositely disposed to shaft 50 extends from the valve through an aperture in the housing cover 53, an arm 54 being secured to the shaft 52 and having rod or cable 55 for manual control from any desirable remote location.

The valve 49 has a passage 56 extending radially from the hollow stub shaft 50 with spaced apertures 57 and 58 leading from said passage to the interior surface 59 of the valve. Recesses 60 and 61 are provided in the valve for the purposes hereinafter specified.

As shown in FIGS. 7 and 8, the control body 26 has transverse apertures 62, spaced longitudinal passageways 63 extending from the apertures 62 to fittings 64 to which hydraulic conduits 65 and 65' are connected, conduit 65 going to the lower end of hydraulic unit 20 and conduit 65' going to the lower end of hydraulic unit 21.

As shown in FIGS. 7 and 9, a transverse passage 66 common to both valves extends across the housing 26 and connects with passageway 67 extending at right angles to passageway 66 and approximately from the midpoint thereof. A vertical passageway 68 extends downwardly to passageway 69 in the lower block 70 of the housing 26, said passageway 69 terminating in fitting 71 to which conduit 72 is connected, said conduit leading to hydraulic fluid tank 27 for return of fluid thereto.

FIGS. 7 and 10 show oppositely disposed transverse apertures 73 with spaced passageway 74 leading to fittings 75 for connection to conduits 76 and 76', conduit 76 leading to hydraulic unit 20 which is used to raise and lower the blade 13, and conduit 76' connecting to hydraulic unit 21 which is used to raise and lower the beam 4.

In FIGS. 7 and 11, central passageway 77 leads from fitting 78 to transverse passage 79 which connects with radial passage 56 in the valve segment 49. A spring urged relief valve 80 is located in recess 81 which extends downwardly and connects with passageway 69 in the lower block 70. (See FIG. 12.) A conduit 82 leads from fitting 78 to fitting 47 on the pump 28. A relief valve screw 83 provides for adjustment of the relief valve.

Operation

In operating my invention, with all elements properly assembled, to lower the blade 13 and cutter bar 14, the control rod 55 operating valve segment 49 is actuated to move said valve segment until aperture 58 is aligned with transverse aperture 73, the hydraulic fluid being forced by the pump through supply conduit 82 through common passageway 79 and passage 56 out through 58, 74 and conduit 76 which leads to the upper end of hydraulic unit 20. The same relative position of valve segment 49' will lower the beam 4 by actuation of hydraulic unit 21.

Raising the blade (or beam) is accomplished by movement of valve segment 49 (or 49') to a position where apertures 57 open to aperture 62, passageway 63 leading to conduit 65 (or conduit 65') which leads to the lower end of hydraulic unit 20 (or unit 21).

Movement of the valve segments provides relief of hydraulic pressure at other ends of the hydraulic units by recesses 60 and 61, recess 60 connecting to aperture 62, passages 66, 68 and 69 for pressure relief when lowering blades or beam, and recess 61 connecting to apertures 73 and 58 for pressure relief when raising blades or beam.

The valve segments 49 and 49' may be retained in a neutral position where no raising or lowering action is effected and the beam and cutter blade and arm are retained in adjusted position. When in neutral the pressure of the hydraulic system is relieved by valve 80 permitting circulation of the hydraulic fluid until the valve segments 49 and 49' are operated.

From the foregoing it will be seen that I have provided a new and novel vehicle carried power control device for implements in which a hydraulic control unit will be self contained on a supporting beam so that the entire power control device including the beam and mower bar and blade can be removed from the vehicle on which it is carried with a minimum of disassembly and will not require any disconnecting of hydraulic lines. Actually, the only points to be connected or disconnected are shaft 1, end 25 of hydraulic unit 21 and the rods or cables 55 for the valve segment controls.

The power source for the mower blade will furnish power for the hydraulic system. Further, I have provided a simple and positive release means for attaching the mower bar which will disconnect quickly and without damage when the mower strikes an obstruction and is subjected to an unusually strong impact.

The power control unit is compact and simple and, is positive in action with remote control means placed close to the vehicle operator for raising and lowering either the mower bar or the beam individually or simultaneously in either direction.

Obviously, changes in form, proportion and details of construction may be resorted to without departing from the spirit of my invention and I reserve all rights to such changes as come within the scope of these specifications and the claims which follow.

What I claim as new and desire to secure by Letters Patent is:

1. A device adapted to be operatively associated with a vehicle having a power takeoff, said device comprising a shaft adapted to be driven by said power takeoff, an elongated beam pivotally mounted at one end on said shaft, a driven implement pivotally mounted on the other end of said beam, driving means operatively associated with said shaft, beam and implement for driving said implement, a hydraulic unit pivotally connected to said beam and said implement and adapted to raise and lower said implement with respect to said beam, another hydraulic unit pivotally connected at one end to said beam and adapted to be connected at its other end to said vehicle so as to raise and lower said beam, and hydraulic means mounted on said beam, said hydraulic means being operated by said driving means and being operatively associated with said first and second mentioned hydraulic units so as to independently activate same and thereby raise and lower said implement and beam, said hydraulic means including a pump on said beam connected to and driven by said driving means and a fluid tank on said beam, said pump, beam and tank having aligned apertures which define a fluid conduit connecting said pump with said tank.

2. The structure as specified in claim 1, wherein said hydraulic means further includes a hydraulic control unit on said beam operatively associated with said pump, tank and both said hydraulic units, and means on said control unit to actuate same so as to control the flow of hydraulic fluid through said control unit to each of said hydraulic units so as to raise and lower said beam and implement.

3. The structure as specified in claim 2, and manually operated means adapted to be located on the vehicle remote from the hydraulic control unit and connected to the means on said control unit to actuate said control unit.

4. The structure as specified in claim 1, said hydraulic control unit comprising a housing provided with oppositely disposed valve chambers, a valve in each chamber, the housing being provided with intake and discharge passages common to each chamber, said housing being further provided with passages from one chamber connecting to the hydraulic unit which raises or lowers the beam and with passages from the other chamber connecting to the hydraulic unit which raises or lowers the implement, each valve being operable independently for individual or simultaneous actuation of the hydraulic units to separately or simultaneously raise or lower the beam and the implement.

5. The structure as specified in claim 1, said hydraulic control unit comprising a housing provided with oppositely disposed coplanar valve chambers, a valve in each chamber, said valves being in coplanar alignment with each other, the housing being provided with intake and discharge passages transversely disposed and common to the valve chambers, conduits leading from the intake and discharge passages of the housing to said pump and tank respectively, and conduits between the hydraulic units and the valve chambers, said valves controlling the flow of fluid through said conduits to selectively actuate the hydraulic units for individual or simultaneous raising or lowering of the beam and the implement.

References Cited in the file of this patent

UNITED STATES PATENTS

| | | |
|---|---|---|
| 2,203,939 | Barrett | June 11, 1940 |
| 2,582,051 | McCloskey | Jan. 8, 1952 |
| 2,729,044 | Dunn et al. | Jan. 3, 1956 |
| 2,822,654 | Elfes et al. | Feb. 11, 1958 |
| 2,828,598 | Anderson et al. | Apr. 1, 1958 |

FOREIGN PATENTS

| | | |
|---|---|---|
| 114,871 | Sweden | Sept. 11, 1945 |